United States Patent
Asaura

(10) Patent No.: US 9,670,812 B2
(45) Date of Patent: Jun. 6, 2017

(54) DETERIORATION DETECTION SYSTEM FOR EXHAUST GAS PURIFICATION APPARATUS

(75) Inventor: Shinya Asaura, Numazu (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 39 days.

(21) Appl. No.: 14/409,729

(22) PCT Filed: Jun. 22, 2012

(86) PCT No.: PCT/JP2012/066022
§ 371 (c)(1),
(2), (4) Date: Jan. 14, 2015

(87) PCT Pub. No.: WO2013/190698
PCT Pub. Date: Dec. 27, 2013

(65) Prior Publication Data
US 2015/0143801 A1 May 28, 2015

(51) Int. Cl.
*F01N 3/00* (2006.01)
*F01N 3/20* (2006.01)
(Continued)

(52) U.S. Cl.
CPC ....... *F01N 3/2066* (2013.01); *B01D 53/9409* (2013.01); *B01D 53/9495* (2013.01);
(Continued)

(58) Field of Classification Search
CPC ........................ F01N 2610/146; F01N 3/208
See application file for complete search history.

(56) References Cited

U.S. PATENT DOCUMENTS 7,418,816 B2 * 9/2008 Upadhyay ............... F01N 3/208
60/274
2009/0301068 A1 12/2009 Fujita et al.
(Continued)

FOREIGN PATENT DOCUMENTS

JP 2009-127496 6/2009
JP 2009-293513 12/2009
(Continued)

*Primary Examiner* — Audrey K Bradley
*Assistant Examiner* — Jason Sheppard
(74) *Attorney, Agent, or Firm* — Finnegan, Henderson, Farabow, Garrett & Dunner, LLP

(57) ABSTRACT

An object of the present invention is to detect deterioration of a selective reduction type catalyst early and improve a detection precision in a deterioration detection system for an exhaust gas purification apparatus including a selective reduction type catalyst disposed in an exhaust passage of an internal combustion engine, a reducing agent adding valve disposed in the exhaust passage upstream of the selective reduction type catalyst, and a $NO_x$ sensor disposed in the exhaust passage downstream of the selective reduction type catalyst. To achieve this object, in the deterioration detection system for an exhaust gas purification apparatus according to the present invention, during control for causing the reducing agent adding valve to add a reducing agent, the reducing agent adding valve is controlled in order to modify a reducing agent addition interval thereof while keeping an addition amount per fixed time period constant. Deterioration of the selective reduction type catalyst is then determined on the basis of a difference in a $NO_x$ purification ratio before and after modification of the addition interval.

17 Claims, 11 Drawing Sheets

(51) Int. Cl.
    *F01N 11/00*     (2006.01)
    *B01D 53/94*     (2006.01)

(52) U.S. Cl.
    CPC .............. *F01N 3/208* (2013.01); *F01N 11/00* (2013.01); *B01D 2251/2067* (2013.01); *B01D 2257/404* (2013.01); *B01D 2258/012* (2013.01); *F01N 2550/02* (2013.01); *F01N 2560/026* (2013.01); *F01N 2610/146* (2013.01); *Y02T 10/24* (2013.01); *Y02T 10/47* (2013.01)

(56) References Cited

U.S. PATENT DOCUMENTS

| | | | |
|---|---|---|---|
| 2011/0047984 A1* | 3/2011 | Lee | F01N 3/206 60/286 |
| 2012/0067114 A1* | 3/2012 | Clerc | G01M 15/102 73/114.75 |
| 2012/0090303 A1* | 4/2012 | Numata | F01N 3/0253 60/287 |

FOREIGN PATENT DOCUMENTS

| | | |
|---|---|---|
| JP | 2010-53807 | 3/2010 |
| JP | 2010-71255 | 4/2010 |
| JP | 2011-202639 | 10/2011 |
| JP | 2013-170570 | 9/2013 |

\* cited by examiner

DETERIORATION DETECTION SYSTEM FOR EXHAUST GAS PURIFICATION APPARATUS

CROSS-REFERENCE TO RELATED APPLICATIONS

This application is a national phase application of International Application No. PCT/JP2012/066022, filed Jun. 22, 2012, the content of which is incorporated herein by reference.

TECHNICAL FIELD

The present invention relates to a technique for detecting deterioration of an exhaust gas purification apparatus disposed in an exhaust passage of an internal combustion engine.

BACKGROUND ART

A conventional exhaust gas purification apparatus is formed by disposing, in an exhaust passage of an internal combustion engine, a selective reduction type catalyst (an SCR catalyst) and a reducing agent adding valve for adding a reducing agent constituted by an ammonia ($NH_3$) precursor (an aqueous solution of urea, ammonium carbamate, or the like) to exhaust gas.

In a proposed technique for detecting deterioration of an exhaust gas purification apparatus such as that described above, deterioration of the selective reduction type catalyst is determined on the basis of a $NO_x$ purification ratio of the selective reduction type catalyst when the internal combustion engine is in a steady state operating condition and a time required for transient variation in the $NO_x$ purification ratio to stabilize in a transient condition (see Patent Document 1, for example).

Patent Document 2 describes a technique of specifying an amount of $NH_3$ actually adsorbed to the selective reduction type catalyst in a high temperature region where an $NH_3$ adsorption capacity of the selective reduction type catalyst decreases, and determining that the selective reduction type catalyst has deteriorated when the specified amount of $NH_3$ is equal to or smaller than a threshold.

Patent Document 3 describes a technique of keeping an addition amount per predetermined time period constant by increasing an addition frequency while shortening an opening interval of a urea water adding valve.

Patent Document 4 describes a technique of modifying an atomized particle size of a urea water solution when the temperature of the selective reduction type catalyst is in a predetermined low temperature region by increasing an injection pressure at which the urea water solution is injected by a reducing agent adding valve.

Patent Document 5 describes a technique of achieving atomization of a reducing agent by supplying the reducing agent from a reducing agent adding valve when a peak of an exhaust gas pressure wave reaches a position of the reducing agent adding valve.

PRIOR ART REFERENCES

Patent Literatures

[Patent Document 1] Japanese Patent Application Publication No. 2011-202639
[Patent Document 2] Japanese Patent Application Publication No. 2009-127496
[Patent Document 3] Japanese Patent Application Publication No. 2010-071255
[Patent Document 4] Japanese Patent Application Publication No. 2009-293513
[Patent Document 5] Japanese Patent Application Publication No. 2010-053807

SUMMARY OF THE INVENTION

Problems to be Solved by the Invention

When deterioration of a selective reduction type catalyst is determined using the method described in Patent Document 1, various conditions must be established. For example, the internal combustion engine must be in a steady state operating condition, the internal combustion engine must be in a transient operating condition, and the transient condition of the internal combustion engine must be maintained until transient variation of the $NO_x$ purification ratio stabilizes. It may therefore take a long time to determine whether or not the selective reduction type catalyst has deteriorated, and as a result, it may be impossible to detect deterioration of the selective reduction type catalyst early. Further, an absolute amount of the $NO_x$ purification ratio when the internal combustion engine is in a steady state operating condition may vary due to a measurement error by a $NO_x$ sensor, an addition amount error by the reducing agent adding valve, and so on, leading to a reduction in detection precision.

The present invention has been designed in consideration of the circumstances described above, and an object thereof is to provide a technique employed in a deterioration detection system for an exhaust gas purification apparatus including a selective reduction type catalyst disposed in an exhaust passage of an internal combustion engine, a reducing agent adding valve disposed in the exhaust passage upstream of the selective reduction type catalyst, and a $NO_x$ sensor disposed in the exhaust passage downstream of the selective reduction type catalyst, with which deterioration of the selective reduction type catalyst can be detected early and with improved detection precision.

Means for Solving the Problems

To solve the problems described above, the present invention provides a deterioration detection system for an exhaust gas purification apparatus including a selective reduction type catalyst disposed in an exhaust passage of an internal combustion engine, a reducing agent adding valve disposed in the exhaust passage upstream of the selective reduction type catalyst, and a $NO_x$ sensor disposed in the exhaust passage downstream of the selective reduction type catalyst, wherein, during control for causing the reducing agent adding valve to add a reducing agent, the reducing agent adding valve is controlled in order to modify a reducing agent addition interval thereof while keeping an addition amount per fixed time period constant. Deterioration of the selective reduction type catalyst is then determined on the basis of a difference in a $NO_x$ purification ratio before and after modification of the addition interval.

More specifically, a deterioration detection system for an exhaust gas purification apparatus according to the present invention includes:

a selective reduction type catalyst disposed in an exhaust passage of an internal combustion engine;

a reducing agent adding valve disposed in the exhaust passage upstream of the selective reduction type catalyst in order to add a reducing agent constituted by an ammonia precursor to exhaust gas;

a $NO_x$ sensor disposed in the exhaust passage downstream of the selective reduction type catalyst in order to measure an amount of nitrogen oxide contained in the exhaust gas;

calculating means for calculating a $NO_x$ purification ratio, which is a ratio of an amount of nitrogen oxide purified by the selective reduction type catalyst relative to an amount of nitrogen oxide flowing into the selective reduction type catalyst, using a measurement value of the $NO_x$ sensor as a parameter;

modifying means for executing modification processing, in which the reducing agent adding valve is controlled in order to modify an addition interval thereof while keeping an addition amount per fixed time period constant, during a reducing agent addition period of the reducing agent adding valve; and determining means for executing determination processing, in which a determination is made as to whether or not the selective reduction type catalyst has deteriorated, on the basis of a difference in the $NO_x$ purification ratio calculated by the calculating means before and after the addition interval is modified by the modifying means.

The inventor of the present application found, as a result of intensive experiments and investigations, that before deterioration occurs in the selective reduction type catalyst, the $NO_x$ purification ratio of the selective reduction type catalyst varies in accordance with the addition interval even when the amount of reducing agent added per fixed time period remains the same. More specifically, the inventor of the present application found that when the reducing agent addition interval is short, the $NO_x$ purification ratio of the selective reduction type catalyst is higher than when the reducing agent addition interval is long. The reason for this is believed to be that when the reducing agent addition interval is short, the amount added each time is smaller than when the reducing agent addition interval is long, and therefore conversion (a decomposition reaction) of the reducing agent (an ammonia precursor) into NH3 is promoted. According to this finding, the difference (referred to hereafter as a "modification difference") in the $NO_x$ purification ratio before and after modification of the addition interval is smaller when the selective reduction type catalyst has already deteriorated than when the selective reduction type catalyst has not yet deteriorated.

Therefore, with the deterioration detection system for an exhaust gas purification apparatus according to the present invention, deterioration of the selective reduction type catalyst can be determined without modifying the amount of reducing agent added by the reducing agent adding valve per fixed time period. Further, the modification processing and the determination processing are executed during a single addition period, and therefore the deterioration determination can be performed on the selective reduction type catalyst in a short time. As a result, deterioration of the selective reduction type catalyst can be detected early.

Here, when a catalyst having an oxidative capacity is disposed in the exhaust passage upstream of the selective reduction type catalyst, the $NO_x$ purification ratio of the selective reduction type catalyst may vary in accordance with a ratio (an NO2/NO ratio) between an amount of nitrogen monoxide (NO) and an amount of nitrogen dioxide (NO2) flowing out of the catalyst. However, the modification processing is executed during the short addition period, and therefore the NO2/NO ratio is less likely to vary greatly before and after modification of the addition interval. As a result, a reduction in determination precision caused by the NO2/NO ratio can be suppressed.

Incidentally, a measurement value of the $NO_x$ sensor may include an error caused by an initial tolerance, temporal variation, and so on. Moreover, an error may occur between an amount of reducing agent actually added by the reducing agent adding valve and a target addition amount due to an initial tolerance, temporal variation, and so on in the reducing agent adding valve. In these cases, the $NO_x$ purification ratio calculated by the calculating means takes a value including the measurement error of the $NO_x$ sensor and the error in the addition amount.

However, the two $NO_x$ purification ratios calculated by the calculating means before and after modification of the addition interval include equivalent errors. Therefore, the modification difference takes a value at which the measurement error in the $NO_x$ sensor and the error in the addition amount are canceled out. As a result, deterioration of the selective reduction type catalyst can be determined accurately even when a measurement error occurs in the $NO_x$ sensor and an error occurs in the addition amount.

As described above, the modification difference is smaller when deterioration has already occurred in the selective reduction type catalyst than when deterioration has not yet occurred. Accordingly, the determining means may determine that the selective reduction type catalyst has deteriorated on condition that the modification difference is smaller than a threshold. Here, the "threshold" takes a value obtained by adding a margin to a modification difference obtained when an amount of $NO_x$ discharged into the atmosphere equals a prescribed amount. This value is determined in advance by adaptation processing using experiments and the like.

Here, when deterioration of the selective reduction type catalyst is determined by comparing the $NO_x$ purification ratio calculated from the measurement value of the $NO_x$ sensor with a normal value (the $NO_x$ purification ratio obtained when deterioration has not occurred in the selective reduction type catalyst), the normal value must be determined in consideration of the measurement error in the $NO_x$ sensor and the error in the addition amount. In other words, the normal value must be set as a range including a plurality of values rather than a single value. However, when the selective reduction type catalyst has already deteriorated and the amount of $NO_x$ flowing into the selective reduction type catalyst is large, the $NO_x$ purification ratio calculated on the basis of the measurement value of the $NO_x$ sensor may be within the normal value range. Therefore, the method of comparing the $NO_x$ purification ratio calculated from the measurement value of the $NO_x$ sensor with a normal value cannot be implemented in an operating region where the amount of $NO_x$ flowing into the selective reduction type catalyst is large.

With the deterioration detection system for an exhaust gas purification apparatus according to the present invention, on the other hand, there is no need to take the measurement error in the $NO_x$ sensor and the error in the addition amount into account, and therefore the threshold can be set as a single value. As a result, deterioration of the selective reduction type catalyst can be determined even in the operating region where the amount of $NO_x$ flowing into the selective reduction type catalyst is large. With the deterioration detection system for an exhaust gas purification apparatus according to the present invention, therefore, a deterioration determination can be executed on the selective reduction type catalyst over a wider operating region.

The modification difference tends to decrease steadily as deterioration of the selective reduction type catalyst advances (as a degree of deterioration increases). Therefore, the determining means according to the present invention may determine a degree of deterioration in the selective reduction type catalyst to be steadily higher as the modification difference decreases below the threshold. According to this method, the degree of deterioration of the selective reduction type catalyst can be determined in addition to determining whether or not the selective reduction type catalyst has deteriorated.

Incidentally, when the selective reduction type catalyst is in a new (or nearly new) condition, the oxidative capacity thereof tends to increase. In a new selective reduction type catalyst, therefore, nitrogen (N2) reduced from the $NO_x$ may be oxidized back (reoxidized hereafter) into $NO_x$ such as NO and NO2. As a result, the modification difference may become smaller than the threshold when the selective reduction type catalyst is in a non-deteriorated new condition.

Hence, when a traveled distance of a vehicle is shorter than a fixed distance, the threshold may be set at a smaller value than when the traveled distance equals or exceeds the fixed distance. Note that here, the "traveled distance" is a distance traveled at a point where a new selective reduction type catalyst is installed in the vehicle. Further, the "fixed distance" is a minimum traveled distance at which an amount of $NO_x$ generated by the reoxidation described above is sufficiently smaller than an amount of $NO_x$ reduced to N2 and NO2. This distance is determined in advance by adaptation processing using experiments and the like.

By determining the threshold using the method described above, a situation in which the selective reduction type catalyst is determined erroneously to have deteriorated can be avoided even when the modification processing and the determination processing are executed with the selective reduction type catalyst in a new or nearly new condition.

The deterioration detection system for an exhaust gas purification apparatus according to the present invention may be configured to determine whether or not the selective reduction type catalyst has deteriorated on condition that a temperature of the selective reduction type catalyst equals or exceeds a lower limit value. More specifically, the modifying means and the determining means may execute the modification processing and the determination processing on condition that the temperature of the selective reduction type catalyst equals or exceeds the lower limit value. Here, the "lower limit value" is a temperature at which an amount of NH3 that can be adsorbed to the selective reduction type catalyst is sufficiently small, or in other words a minimum temperature at which the reducing agent addition interval is reflected in the $NO_x$ purification ratio. Note that the lower limit value is preferably set at a minimum temperature at which NH3 is not adsorbed to the selective reduction type catalyst.

The $NO_x$ purification ratio of the selective reduction type catalyst varies according to the amount of NH3 adsorbed to the selective reduction type catalyst (referred to hereafter as an "NH3 adsorption amount"). For example, the $NO_x$ purification ratio is higher when the NH3 adsorption amount is large than when the NH3 adsorption amount is small. When the NH3 adsorption amount of the selective reduction type catalyst is large, therefore, the $NO_x$ purification ratio may increase regardless of the reducing agent addition interval. In other words, when the modification processing is executed while the NH3 adsorption amount of the selective reduction type catalyst is large, the modification difference may decrease even though the selective reduction type catalyst has not deteriorated. As a result, the selective reduction type catalyst may be determined erroneously to have deteriorated despite having not deteriorated.

Hence, the modification processing and the determination processing are preferably executed when the NH3 adsorption amount of the selective reduction type catalyst is small, or in other words when the reducing agent addition interval can be reflected in the $NO_x$ purification ratio.

Alternatively, a method of executing the modification processing and the determination processing when a majority of the NH3 adsorbed to the selective reduction type catalyst has been consumed in a $NO_x$ reduction reaction may be considered. When the NH3 adsorption amount of the selective reduction type catalyst is large, however, it takes time for the NH3 to be consumed, and it may therefore be impossible to detect deterioration of the selective reduction type catalyst quickly.

By executing the modification processing and the determination processing on condition that the temperature of the selective reduction type catalyst equals or exceeds the lower limit value, on the other hand, a reduction in determination precision can be suppressed, and deterioration of the selective reduction type catalyst can be detected quickly.

In a case where a particulate filter is disposed upstream of the selective reduction type catalyst, the selective reduction type catalyst is exposed to a high temperature of approximately 500 ☐ C or greater when regeneration processing is executed on the particulate filter, and as a result, ammonia (NH3) is less likely to be adsorbed to the selective reduction type catalyst. The modification processing and the determination processing may therefore be executed while regeneration processing is being implemented on the particulate filter or immediately after the regeneration processing (i.e. at or above the minimum temperature at which ammonia (NH3) is not adsorbed to the selective reduction type catalyst).

Incidentally, before deterioration occurs in the selective reduction type catalyst, the $NO_x$ purification ratio tends to decrease when the temperature of the selective reduction type catalyst is excessively high. Therefore, when the temperature of the selective reduction type catalyst is excessively high, a difference between the modification difference obtained before the selective reduction type catalyst deteriorates and the modification difference obtained after the selective reduction type catalyst deteriorates may decrease.

Hence, when the temperature of the selective reduction type catalyst exceeds an upper limit value, the modifying means and the determining means may be prevented from executing the modification processing and the determination processing. In so doing, an erroneous determination can be suppressed. Here, the "upper limit value" is a temperature obtained by subtracting a margin from a minimum temperature at which the difference between the modification difference obtained before the selective reduction type catalyst deteriorates and the modification difference obtained after the selective reduction type catalyst deteriorates becomes striking.

Further, the $NO_x$ purification ratio of the selective reduction type catalyst may vary in response to a breakdown or the like in the reducing agent adding valve or an apparatus that supplies the reducing agent to the reducing agent adding valve, as well as deterioration of the selective reduction type catalyst. Therefore, the modification processing and the determination processing are preferably executed when a breakdown has not occurred in the reducing agent adding valve.

Accordingly, the deterioration detection system for an exhaust gas purification apparatus according to the present invention may further include diagnosing means for diagnosing a breakdown in the reducing agent adding valve. In this case, the modifying means and the determining means may execute the modification processing and the determination processing on condition that a breakdown in the reducing agent adding valve has not been diagnosed by the diagnosing means. As a result, deterioration of the selective reduction type catalyst can be determined more accurately.

Here, when the amount of reducing agent actually added by the reducing agent adding valve diverges from the target addition amount, the $NO_x$ purification ratio obtained with a short addition interval tends to be unstable. When the amount of reducing agent actually added by the reducing agent adding valve is equal or close to the target addition amount, on the other hand, the $NO_x$ purification ratio obtained with a short addition interval tends to remain stable regardless of the deterioration condition of the selective reduction type catalyst.

Hence, the diagnosing means may determine that a breakdown has occurred in the reducing agent adding valve when an amount of variation in the $NO_x$ purification ratio following shortening of the addition interval by the modifying means is larger than a reference value. In so doing, a breakdown in the reducing agent adding valve can be diagnosed regardless of the deterioration condition of the selective reduction type catalyst.

Effect of the Invention

According to the present invention, in a deterioration detection system for an exhaust gas purification apparatus including a selective reduction type catalyst disposed in an exhaust passage of an internal combustion engine, a reducing agent adding valve disposed in the exhaust passage upstream of the selective reduction type catalyst, and a $NO_x$ sensor disposed in the exhaust passage downstream of the selective reduction type catalyst, deterioration of the selective reduction type catalyst can be detected early and with improved detection precision.

MODES FOR CARRYING OUT THE INVENTION

Specific embodiments of the present invention will be described below on the basis of the drawings. Unless specified otherwise, the technical scope of the present invention is not limited to the dimensions, materials, shapes, arrangements, and so on of constituent components described in the embodiments.

First Embodiment

Figure 1:
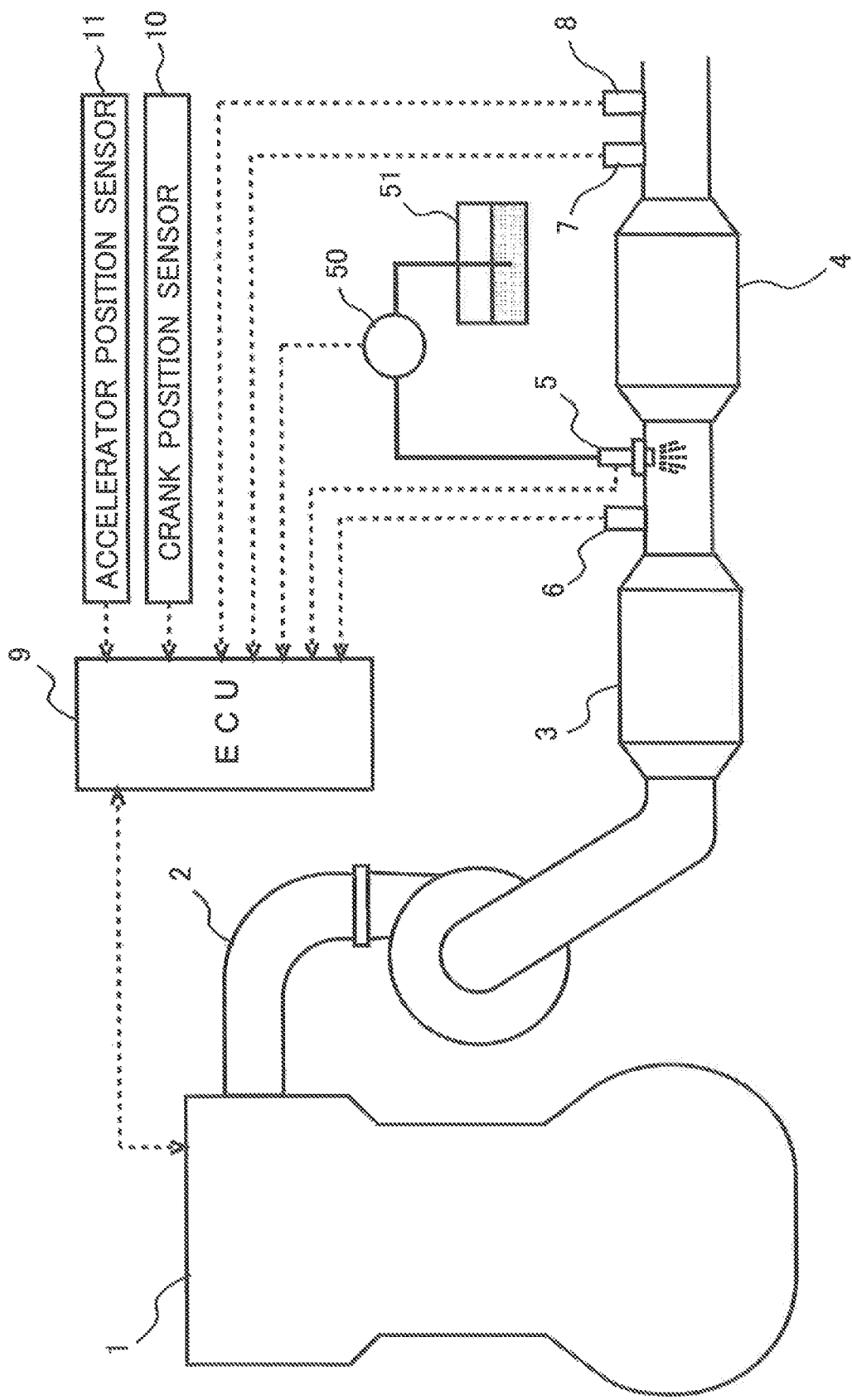
FIG. 1 is a schematic view showing a configuration of an exhaust system of an internal combustion engine to which the present invention is applied.

First, a first embodiment of the present invention will be described on the basis of FIGS. 1 to 4. FIG. 1 is a schematic view showing a configuration of an exhaust system of an internal combustion engine to which the present invention is applied. An internal combustion engine 1 shown in FIG. 1 is a compression ignition type internal combustion engine (a diesel engine), but may be a spark ignition type internal combustion engine (a gasoline engine) capable of a lean burn operation.

In FIG. 1, an exhaust passage 2 is connected to the internal combustion engine 1. The exhaust passage 2 is a passage through which burned gas (exhaust gas) discharged from a cylinder of the internal combustion engine 1 flows. A first catalyst casing 3 and a second catalyst casing 4 are disposed midway in the exhaust passage 2 in series from an upstream side.

An oxidation catalyst and a particulate filter are housed in a tubular casing constituting the first catalyst casing 3. At this time, the oxidation catalyst may be carried on a catalyst carrier disposed upstream of the particulate filter or on the particulate filter.

A catalyst carrier carrying a selective reduction type catalyst is housed in a tubular casing constituting the second catalyst casing 4. The catalyst carrier is formed by coating a monolithic base material having a honeycomb-shaped cross-section, which is constituted by cordierite or Fe—Cr—Al based heat resisting steel, for example, with an alumina based or zeolite based active component (a carrier). Further, a precious metal catalyst (platinum (Pt), palladium (Pd), or the like, for example) having an oxidative capacity is carried on the catalyst carrier. Note that a catalyst carrier carrying an oxidation catalyst may be disposed in the second catalyst casing 4 downstream of the selective reduction type catalyst. In this case, the oxidation catalyst is used to oxidize reducing agent that slips out of the selective reduction type catalyst, from among a reducing agent supplied to the selective reduction type catalyst by a reducing agent adding valve 5 to be described below.

The reducing agent adding valve 5 is attached to the exhaust passage 2 between the first catalyst casing 3 and the second catalyst casing 4 in order to add (inject) a reducing agent constituted by an ammonia precursor to the exhaust gas. The reducing agent adding valve 5 is a valve apparatus having an injection hole that is opened and closed by moving a needle. The reducing agent adding valve 5 is connected to a reducing agent tank 51 via a pump 50. The pump 50 suctions the reducing agent stored in the reducing agent tank 51, and pumps the suctioned reducing agent to the reducing agent adding valve 5. The reducing agent adding valve 5 injects the reducing agent pumped from the pump 50 into the exhaust passage 2. Note that opening/closing timings of the reducing agent adding valve 5 and a discharge pressure of the pump 50 are controlled electrically by an ECU 9, to be described below.

Here, an aqueous solution of urea, ammonium carbamate, or the like may be used as the reducing agent stored in the reducing agent tank 51. In this embodiment, it is assumed that a urea water solution is used as the reducing agent.

When the urea water solution is injected through the reducing agent adding valve 5, the urea water solution flows into the second catalyst casing 4 together with the exhaust gas. At this time, the urea water solution is pyrolyzed or hydrolyzed by heat received from the exhaust gas and the selective reduction type catalyst. When the urea water solution is pyrolyzed or hydrolyzed, NH3 is generated. The NH3 generated in this manner is adsorbed or occluded to the selective reduction type catalyst. The NH3 adsorbed or occluded to the selective reduction type catalyst reacts with $NO_x$ contained in the exhaust gas to generate nitrogen (N2) and water (H2O). In other words, the NH3 functions as a $NO_x$ reducing agent. When NH3 is adsorbed to a wide range of the selective reduction type catalyst at this time, a $NO_x$ purification ratio of the selective reduction type catalyst increases.

An ECU 9 is provided alongside the internal combustion engine 1 thus configured. The ECU 9 is an electronic control unit including a CPU, a ROM, a RAM, a backup RAM, and so on. Various sensors, such as an upstream side $NO_x$ sensor 6, a downstream side $NO_x$ sensor 7, an exhaust gas temperature sensor 8, a crank position sensor 10, and an accelerator position sensor 11, are electrically connected to the ECU 9.

The upstream side $NO_x$ sensor 6 is disposed in the exhaust passage 2 downstream of the first catalyst casing 3 and upstream of the second catalyst casing 4, and outputs an electric signal correlating with an amount of $NO_x$ contained in the exhaust gas flowing into the second catalyst casing 4 (to be referred to hereafter as a "$NO_x$ inflow amount"). The downstream side $NO_x$ sensor 7 is disposed in the exhaust passage 2 downstream of the second catalyst casing 4, and outputs an electric signal correlating with an amount of $NO_x$ flowing out of the second catalyst casing 4 (to be referred to hereafter as a "$NO_x$ outflow amount"). The exhaust gas temperature sensor 8 is disposed in the exhaust passage 2 downstream of the second catalyst casing 4, and outputs an electric signal correlating with a temperature of the exhaust gas flowing out of the second catalyst casing 4. The crank position sensor 10 outputs an electric signal correlating with a rotation position of an output shaft 8a (crankshaft) of the internal combustion engine 1. The accelerator position sensor 11 outputs an electric signal correlating with an operation amount of an accelerator pedal (an accelerator opening).

Various devices (a fuel injection valve and so on, for example) attached to the internal combustion engine 1, the reducing agent adding valve 5, the pump 50, and so on are electrically connected to the ECU 9. The ECU 9 electrically controls the various devices of the internal combustion engine 1, the reducing agent adding valve 5, the pump 50, and the like on the basis of the output signals from the various sensors described above. For example, as well as conventional control such as fuel injection control of the internal combustion engine 1 and addition control for causing the reducing agent adding valve 5 to inject the reducing agent intermittently, the ECU 9 executes processing for determining deterioration of the selective reduction type catalyst. The processing for determining deterioration of the selective reduction type catalyst will be described below.

In the processing for determining deterioration of the selective reduction type catalyst, the ECU 9 controls (performs modification processing on) the reducing agent adding valve 5 in order to modify an addition frequency thereof without modifying an addition amount per fixed time period while executing control to cause the reducing agent adding valve 5 to inject the reducing agent intermittently (i.e. during an addition period). The ECU 9 then determines whether or not the selective reduction type catalyst has deteriorated using as a parameter a difference (a modification difference) in the $NO_x$ purification ratio before and after modification of the addition frequency.

Here, the "addition frequency" corresponds to an inverse of an interval (an addition interval) in which the reducing agent adding valve 5 injects the reducing agent, and takes a steadily larger value (a higher frequency) as the addition interval shortens. Further, the "$NO_x$ purification ratio" is a ratio of the amount of $NO_x$ purified by the selective reduction type catalyst relative to the amount of $NO_x$ flowing into the second catalyst casing 4 (the $NO_x$ inflow amount).

The $NO_x$ inflow amount corresponds to the amount of $NO_x$ discharged from the internal combustion engine 1, and can therefore be calculated using operating conditions of the internal combustion engine 1 (an engine rotation speed, the accelerator opening, an intake air amount, a fuel injection amount, and so on) as parameters. Note that when the upstream side $NO_x$ sensor 6 is attached to the exhaust passage 2 between the first catalyst casing 3 and the second catalyst casing 4, as shown in FIG. 1, the output signal of the upstream side $NO_x$ sensor 6 may be used as the $NO_x$ inflow amount.

The ECU 9 calculates a $NO_x$ purification ratio EnoX using the output signal of the upstream side $NO_x$ sensor 6 (the $NO_x$ inflow amount), the output signal of the downstream side $NO_x$ sensor 7 (the $NO_x$ outflow amount), and a following equation. Note that in the following equation, $ANO_x$in is the $NO_x$ inflow amount and $ANO_x$out is the $NO_x$ outflow amount.

$$EnoX = (ANO_x in - ANO_x out)/ANO_x in$$

The $NO_x$ purification ratio EnoX is calculated after modification of the addition frequency and before modification of the addition frequency. Hereafter, the $NO_x$ purification ratio EnoX obtained before modification of the addition frequency will be referred to as a first $NO_x$ purification ratio EnoX1 and the $NO_x$ purification ratio EnoX obtained after modification of the addition frequency will be referred to as a second $NO_x$ purification ratio EnoX2.

The ECU 9 calculates an absolute value of a difference (a modification difference) □EnoX (EnoX2−EnoX1) between the first $NO_x$ purification ratio EnoX1 and the second $NO_x$ purification ratio EnoX2, and determines whether or not the resulting value is smaller than a threshold. When the absolute value of the modification difference □EnoX is smaller than the threshold, the ECU 9 determines that the selective reduction type catalyst has deteriorated. Note that the addition frequency obtained after the modification processing is executed (after the addition frequency is modified) may be set to be either lower or higher than the addition frequency obtained before the modification processing is executed (before the addition frequency is modified).

Figure 2:
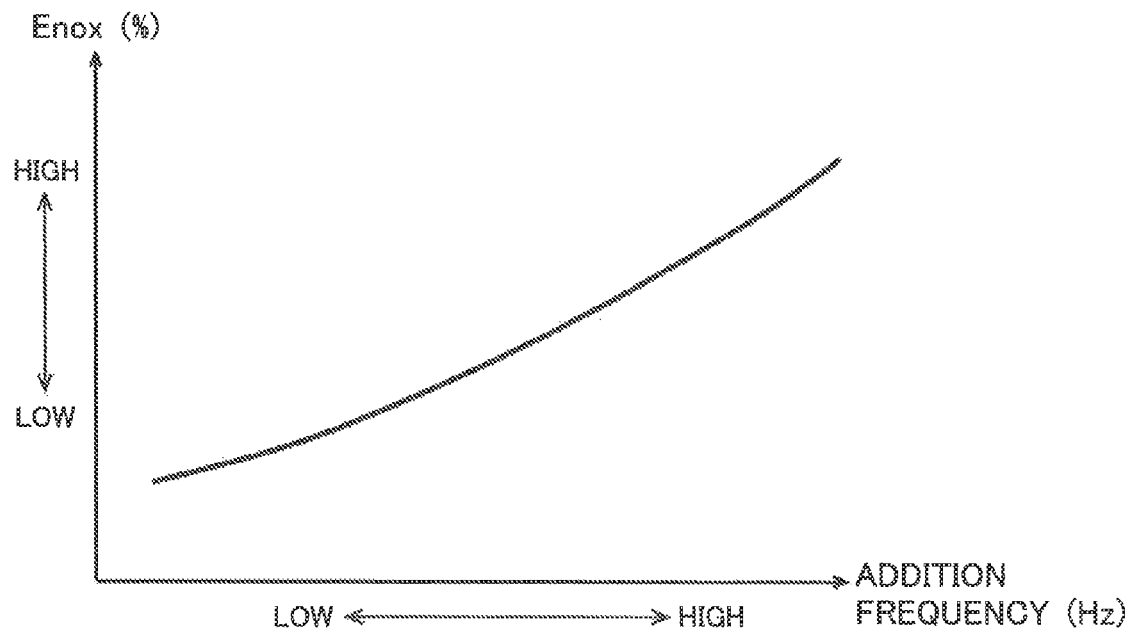
FIG. 2 is a view showing a relationship between a reducing agent addition frequency and a $NO_x$ purification ratio EnoX of a selective reduction type catalyst.

Here, FIG. 2 shows a relationship between the addition frequency and the $NO_x$ purification ratio EnoX before the selective reduction type catalyst deteriorates. In FIG. 2, the $NO_x$ purification ratio EnoX before the selective reduction type catalyst deteriorates is larger when the addition frequency is high than when the addition frequency is low. In other words, the $NO_x$ purification ratio EnoX increases as the addition frequency increases. The reason for this is believed to be that when the addition frequency is high, the amount of reducing agent added each time by the reducing agent adding valve 5 is smaller than when the addition frequency is low, and therefore conversion (hydrolysis and pyrolysis) of the urea water solution into NH3 is promoted. After the selective reduction type catalyst deteriorates, on the other hand, a reaction is less likely to occur between the NH3 and the $NO_x$, and therefore the modification difference decreases relative to a difference in the addition frequency.

Hence, when the absolute value of the modification difference □EnoX is smaller than the threshold, it can be determined that the selective reduction type catalyst has deteriorated. Note that here, the "threshold" is a value obtained by subtracting a margin from a minimum value that can be taken by the absolute value of the modification difference □EnoX when the selective reduction type catalyst has not yet deteriorated. This value is determined in advance by adaptation processing using experiments or the like.

Further, the absolute value of the modification difference □EnoX tends to decrease as a degree of deterioration of the selective reduction type catalyst increases (i.e. as deterioration of the selective reduction type catalyst advances). Therefore, when the absolute value of the modification difference □EnoX is smaller than the threshold, the ECU 9 may determine the degree of deterioration of the selective reduction type catalyst to be steadily larger as a difference between the absolute value and the threshold increases.

When the processing for determining deterioration of the selective reduction type catalyst is executed according to this method, deterioration of the selective reduction type catalyst can be determined without modifying the amount of reducing agent added per fixed time period. Accordingly, the amount of reducing agent supplied to the selective reduction type catalyst is neither excessive nor insufficient. As a result, deterioration of the selective reduction type catalyst can be determined while avoiding situations in which an amount of NH3 slipping out of the selective reduction type catalyst becomes excessive or the amount of $NO_x$ purified by the selective reduction type catalyst becomes insufficient. In other words, an increase in exhaust gas emissions caused by implementation of the deterioration determination processing can be suppressed. Furthermore, the deterioration determination processing according to this embodiment is executed during the reducing agent addition period, and therefore deterioration of the selective reduction type catalyst can be detected quickly.

Incidentally, when an oxidation catalyst is disposed in the exhaust passage upstream of the selective reduction type catalyst, the $NO_x$ purification ratio of the selective reduction type catalyst may vary in accordance with a ratio (an NO2/NO ratio) between an amount of nitrogen monoxide (NO) and an amount of nitrogen dioxide (NO2) flowing out of the oxidation catalyst. However, the modification processing according to this embodiment is executed during a single short addition period, and therefore the NO2/NO ratio is unlikely to vary greatly before and after modification of the addition frequency. As a result, a reduction in determination precision caused by the NO2/NO ratio can be suppressed.

Furthermore, the respective measurement values of the upstream side $NO_x$ sensor 6 and the downstream side $NO_x$ sensor 7 may include errors caused by an initial tolerance, temporal variation, and so on in the upstream side $NO_x$ sensor 6 and the downstream side $NO_x$ sensor 7. Moreover, an error may occur between an amount of reducing agent actually added by the reducing agent adding valve 5 (an "actual addition amount" hereafter) and a target addition amount due to an initial tolerance, temporal variation, and so on in the reducing agent adding valve 5. In these cases, the $NO_x$ purification ratio EnoX calculated on the basis of the above equation takes a value including the measurement errors of the upstream side $NO_x$ sensor 6 and the downstream side $NO_x$ sensor 7 and the error in the actual addition amount.

However, the first $NO_x$ purification ratio EnoX1 and the second $NO_x$ purification ratio EnoX2 include equivalent errors. Therefore, the modification difference □EnoX takes a value at which the measurement errors and the error in the actual addition amount are canceled out. Hence, with the deterioration determination processing according to this embodiment, deterioration of the selective reduction type catalyst can be determined even when the measurement errors and the error in the actual addition amount described above occur.

In a conventional deterioration determination method, deterioration of the selective reduction type catalyst is determined by comparing the $NO_x$ purification ratio with a normal value (a $NO_x$ purification ratio obtained when the selective reduction type catalyst has not yet deteriorated). When this method is used, the normal value must be determined in consideration of the measurement errors and the error in the actual addition amount. In other words, the normal value must be set as a range including a plurality of values rather than a single value. However, when the selective reduction type catalyst has already deteriorated and the amount of $NO_x$ flowing into the selective reduction type catalyst is large, the $NO_x$ purification ratio may be within the normal value range. Therefore, this conventional deterioration determination method cannot be implemented in an operating region where the $NO_x$ inflow amount of the selective reduction type catalyst is large.

In the deterioration determination processing according to this embodiment, on the other hand, the measurement errors and the error in the actual addition amount do not have to be taken into account, and therefore the deterioration determination processing can be performed even in the operating region where the $NO_x$ inflow amount of the selective reduction type catalyst is large. In other words, the deterioration determination processing can be executed over a wider operating region than the conventional deterioration determination method described above. With the deterioration determination processing according to this embodiment, therefore, deterioration of the selective reduction type catalyst can be detected earlier than with the conventional deterioration determination method described above.

The $NO_x$ purification ratio EnoX calculated on the basis of the above equation also varies when a breakdown occurs in the upstream side $NO_x$ sensor 6 or the downstream side $NO_x$ sensor 7 or a breakdown occurs in the reducing agent adding valve 5 or the pump 50. Accordingly, the absolute value of the modification difference □EnoX may fall below the threshold even though the selective reduction type catalyst has not deteriorated. Conversely, the absolute value of the modification difference □EnoX may equal or exceed the threshold even though the selective reduction type catalyst has deteriorated. Therefore, the processing for detecting an abnormality in the reducing agent adding valve 5 is preferably implemented on condition that the upstream side $NO_x$ sensor 6 and the downstream side $NO_x$ sensor 7 are normal, and that the reducing agent adding valve 5 and the pump 50 are normal.

For this purpose, the ECU 9 executes processing for determining a breakdown in the upstream side $NO_x$ sensor 6 and the downstream side $NO_x$ sensor 7 and processing for determining a breakdown in the reducing agent adding valve 5 and the pump 50 before executing the processing for determining deterioration of the selective reduction type catalyst.

For example, the ECU 9 determines whether or not the upstream side $NO_x$ sensor 6 and the downstream side $NO_x$ sensor 7 have become disconnected by implementing a conduction check thereon. When the upstream side $NO_x$ sensor 6 and the downstream side $NO_x$ sensor 7 are not disconnected, the ECU 9 determines whether or not a reduction has occurred in a measurement precision of the upstream side $NO_x$ sensor 6 and the downstream side $NO_x$ sensor 7 on the basis of a difference between the respective output signals of the upstream side $NO_x$ sensor 6 and the downstream side $NO_x$ sensor 7 while no reducing agent is injected by the reducing agent adding valve 5. In other words, when the difference between the respective output signals of the upstream side $NO_x$ sensor 6 and the downstream side $NO_x$ sensor 7 while no reducing agent is injected by the reducing agent adding valve 5 is equal to or smaller than a fixed value, the ECU 9 determines that the measurement precision of the upstream side $NO_x$ sensor 6 and the downstream side $NO_x$ sensor 7 is within an allowable range. This determination is preferably implemented when no NH3 is adsorbed to the selective reduction type catalyst.

Figure 3:
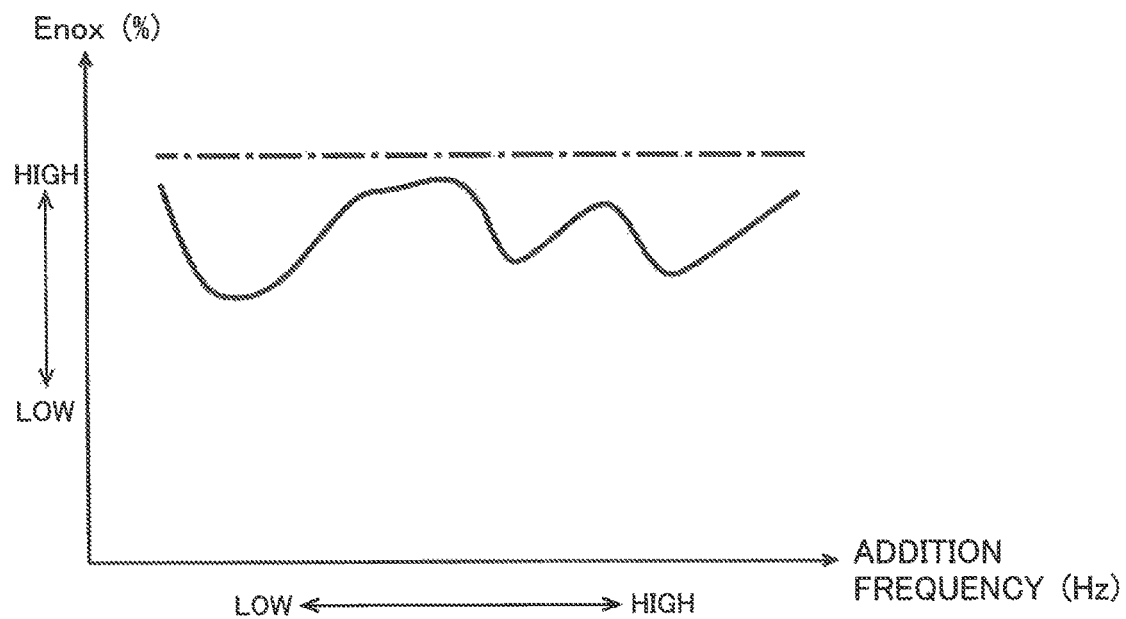
FIG. 3 is a view showing temporal variation in the $NO_x$ purification ratio EnoX when the addition frequency is increased in a case where a breakdown has occurred in a reducing agent adding valve or a pump.

Meanwhile, the ECU 9 determines (diagnoses) a breakdown in the reducing agent adding valve 5 and the pump 50 on the basis of an amount of variation in the $NO_x$ purification ratio following an increase in the addition frequency. Here, FIG. 3 shows the $NO_x$ purification ratio EnoX in a case where the amount of reducing agent actually added by the reducing agent adding valve 5 (referred to hereafter as the "actual addition amount") has diverged from the target addition amount. A solid line in FIG. 3 shows the $NO_x$ purification ratio EnoX when the actual addition amount has diverged from the target addition amount, and a dot-dash line in FIG. 3 shows the $NO_x$ purification ratio EnoX when the actual addition amount is substantially equal to the target addition amount.

As shown in FIG. 3, when the actual addition amount is substantially equal to the target addition amount, the $NO_x$ purification ratio EnoX of the selective reduction type catalyst takes a substantially fixed value. When the actual addition amount diverges from the target addition amount, on the other hand, the $NO_x$ purification ratio EnoX of the selective reduction type catalyst does not stabilize at a fixed value, and instead takes random values that vary over time.

Hence, when the amount of variation in the $NO_x$ purification ratio following an increase in the addition frequency is larger than a reference value, the ECU 9 determines that a breakdown has occurred in the reducing agent adding valve 5 or the pump 50. Here, the "reference value" is a value obtained by adding a margin to a maximum value that can be taken by the amount of variation in the $NO_x$ purification ratio EnoX when a difference between the actual addition amount and the target addition amount is within an allowable range.

When the processing for determining deterioration of the selective reduction type catalyst is executed after determining through the method described above that a breakdown has not occurred in the upstream side $NO_x$ sensor 6 and the downstream side $NO_x$ sensor 7 and a breakdown has not occurred in the reducing agent adding valve 5 and the pump 50, a reduction in determination precision caused by a breakdown in the upstream side $NO_x$ sensor 6 and the downstream side $NO_x$ sensor 7 or a breakdown in the reducing agent adding valve 5 and the pump 50 can be suppressed.

Figure 4:
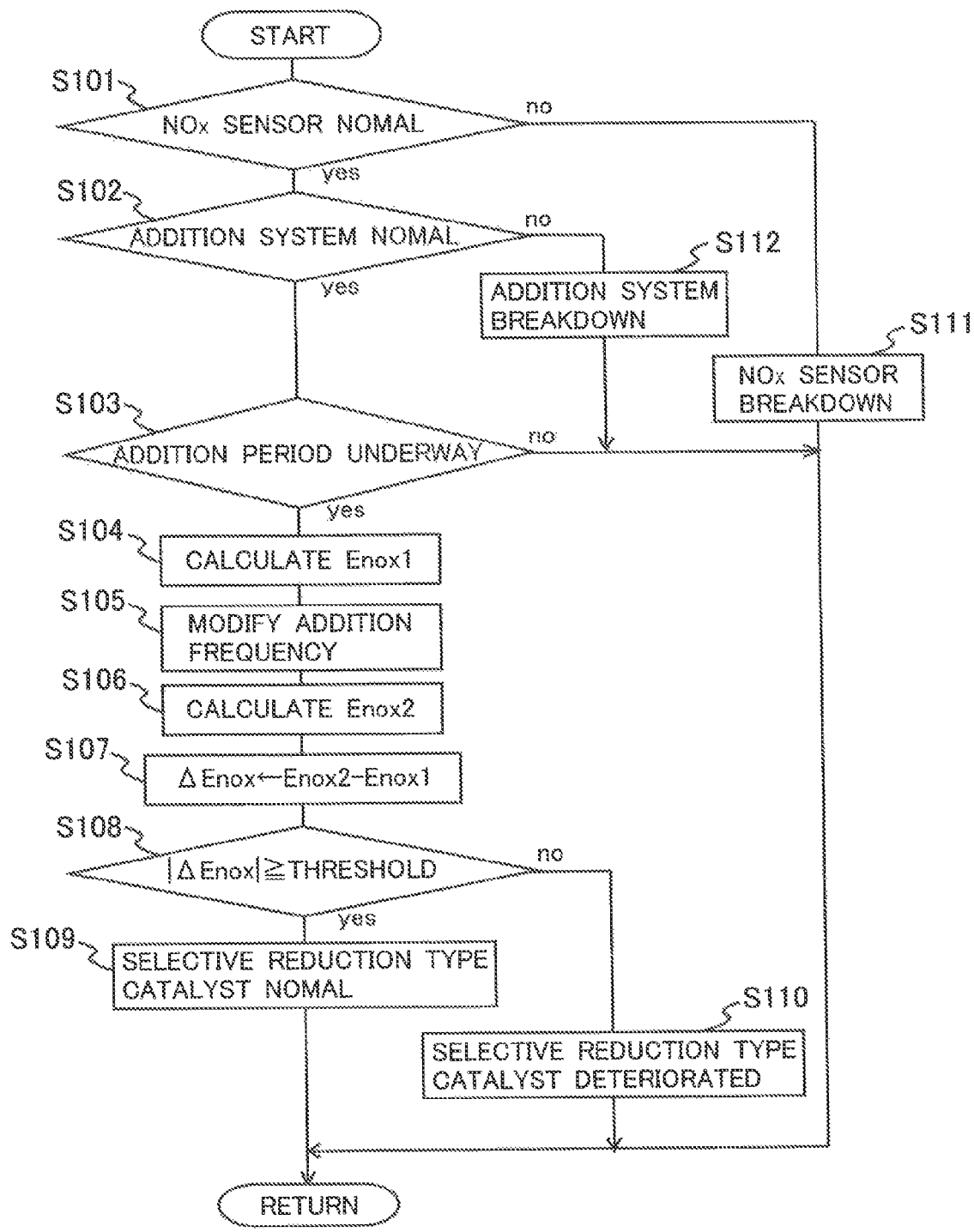
FIG. 4 is a flowchart showing a processing routine executed by an ECU when processing for determining deterioration of the selective reduction type catalyst is executed according to a first embodiment.

Procedures executed during the deterioration determination processing according to this embodiment will now be described using FIG. 4. FIG. 4 is a flowchart showing a processing routine executed by the ECU 9 to determine whether or not the selective reduction type catalyst has deteriorated. This processing routine is stored in the ROM or the like of the ECU 9 in advance, and executed periodically by the ECU 9.

In the processing routine of FIG. 4, first, in S101, the ECU 9 determines whether or not the upstream side $NO_x$ sensor 6 and the downstream side $NO_x$ sensor 7 are normal. More specifically, the ECU 9 first implements a conduction check on the upstream side $NO_x$ sensor 6 and the downstream side $NO_x$ sensor 7. When it is determined as a result of the conduction check that neither the upstream side $NO_x$ sensor 6 nor the downstream side $NO_x$ sensor 7 is disconnected, the ECU 9 determines whether or not the measurement precision of the upstream side $NO_x$ sensor 6 and the downstream side $NO_x$ sensor 7 has decreased on the basis of the difference between the respective output signals of the upstream side $NO_x$ sensor 6 and the downstream side $NO_x$ sensor 7 while no reducing agent is injected by the reducing agent adding valve 5.

When, in S101, a disconnection is detected or the measurement precision of the upstream side $NO_x$ sensor 6 or the downstream side $NO_x$ sensor 7 is determined to have decreased, the ECU 9 advances to processing of S111, where a breakdown is determined to have occurred in at least one of the upstream side $NO_x$ sensor 6 and the downstream side $NO_x$ sensor 7. Further, when, in S101, a disconnection is not detected and the measurement precision of both the upstream side $NO_x$ sensor 6 and the downstream side $NO_x$ sensor 7 is not determined to have decreased, the ECU 9 advances to processing of S102.

In S102, the ECU 9 determines whether or not an addition system including the reducing agent adding valve 5 and the pump 50 is normal. More specifically, the ECU 9 increases the addition frequency (shortens the addition interval) without modifying the addition amount per fixed time period while the reducing agent is added by the reducing agent adding valve 5. After increasing the addition frequency, the ECU 9 calculates an amount of variation in the $NO_x$ purification ratio EnoX per unit time on the basis of the measurement values of the upstream side $NO_x$ sensor 6 and the downstream side $NO_x$ sensor 7 and the above equation. The ECU 9 then determines whether or not the amount of variation in the $NO_x$ purification ratio EnoX per unit time is equal to or smaller than the aforesaid reference value.

When it is determined in S102 that the amount of variation in the $NO_x$ purification ratio EnoX per unit time is larger than the reference value, the ECU 9 advances to S112, where a breakdown is determined to have occurred in the addition system. When, on the other hand, it is determined in S102 that the amount of variation in the $NO_x$ purification ratio EnoX per unit time is equal to or smaller than the reference value, the ECU 9 advances to S103. Note that by having the ECU 9 execute the processing of S102 and S112, diagnosing means according to the present invention is realized.

When it is determined in S111 that a breakdown has occurred in at least one of the upstream side $NO_x$ sensor 6 and the downstream side $NO_x$ sensor 7 or it is determined in S112 that a breakdown has occurred in the addition system, the ECU 9 terminates execution of the current routine without executing the processing for determining deterioration of the selective reduction type catalyst. As a result, an erroneous determination caused by a breakdown in the upstream side $NO_x$ sensor 6 or the downstream side $NO_x$ sensor 7, a breakdown in the reducing agent adding valve 5 or the pump 50, or the like is suppressed.

In S103, the ECU 9 determines whether or not the reducing agent addition period is underway. When the determination of S103 is negative, the ECU 9 terminates execution of the current routine. Note that when the determination of S103 is negative, the ECU 9 may execute the processing of S103 repeatedly until reducing agent addition is started. When the determination of S103 is affirmative, the ECU 9 advances to S104.

In S104, the ECU 9 reads the output signal (the $NO_x$ inflow amount) $ANO_x$in of the upstream side $NO_x$ sensor 6 and the output signal (the $NO_x$ outflow amount) $ANO_x$out of the downstream side $NO_x$ sensor 7, and calculates the first $NO_x$ purification ratio EnoX1 In other words, the ECU 9 calculates the $NO_x$ purification ratio (the first $NO_x$ purification ratio EnoX1) of the selective reduction type catalyst prior to modification of the addition frequency.

In S105, the ECU 9 controls the reducing agent adding valve 5 in order to modify the addition frequency. Next, in S106, the ECU 9 reads the output signal (the $NO_x$ inflow amount) $ANO_x$in of the upstream side $NO_x$ sensor 6 and the output signal (the $NO_x$ outflow amount) $ANO_x$out of the downstream side $NO_x$ sensor 7 again, and calculates the second $NO_x$ purification ratio EnoX2. In other words, the ECU 9 calculates the $NO_x$ purification ratio (the second $NO_x$ purification ratio EnoX2) of the selective reduction type catalyst following modification of the addition frequency.

By having the ECU 9 execute the processing of S104 and S106, calculating means according to the present invention is realized. Further, by having the ECU 9 execute the processing of S105, modifying means according to the present invention is realized.

In S107, the ECU 9 calculates the difference (the modification difference) □EnoX (=EnoX2−EnoX1) between the first $NO_x$ purification ratio EnoX1 calculated in S104 and the second $NO_x$ purification ratio EnoX2 calculated in S106.

In S108, the ECU 9 determines whether or not the absolute value of the modification difference □EnoX calculated in S107 equals or exceeds the threshold. When the determination of S108 is affirmative (□□EnoX□ □ threshold), the ECU 9 advances to S109, where the selective reduction type catalyst is determined to be normal (not to have deteriorated). When the determination of S108 is negative (□□EnoX□<threshold), on the other hand, the ECU 9 advances to S110, where the selective reduction type catalyst is determined to have deteriorated. At this time, the ECU 9 may determine the degree of deterioration of the selective reduction type catalyst to be steadily larger as the difference between □□EnoX□ and the threshold increases. Further, when it is determined in S110 that the selective reduction type catalyst has deteriorated, the ECU 9 may store information indicating that the selective reduction type catalyst has deteriorated in the backup RAM or the like, and notify a driver that the selective reduction type catalyst has deteriorated.

By having the ECU 9 execute the processing of S108 to S110, determining means according to the present invention is realized.

According to the embodiment described above, the processing for determining deterioration of the selective reduction type catalyst can be implemented while suppressing an increase in exhaust gas emissions. Further, since the deterioration determination processing according to this embodiment is executed during the reducing agent addition period, deterioration of the selective reduction type catalyst can be detected early. Moreover, with the deterioration determination processing according to this embodiment, deterioration of the selective reduction type catalyst can be determined even when a measurement error occurs in the upstream side $NO_x$ sensor 6 and the downstream side $NO_x$ sensor 7 or an error occurs in the actual addition amount.

Second Embodiment

Next, a second embodiment of the deterioration detection system for an exhaust gas purification apparatus according to the present invention will be described on the basis of FIGS. 5 to 7. Here, configurations that differ from the first embodiment will be described, and description of similar configurations has been omitted.

This embodiment differs from the first embodiment in that the deterioration determination processing is executed when the selective reduction type catalyst is within a predetermined temperature range.

Figure 5:
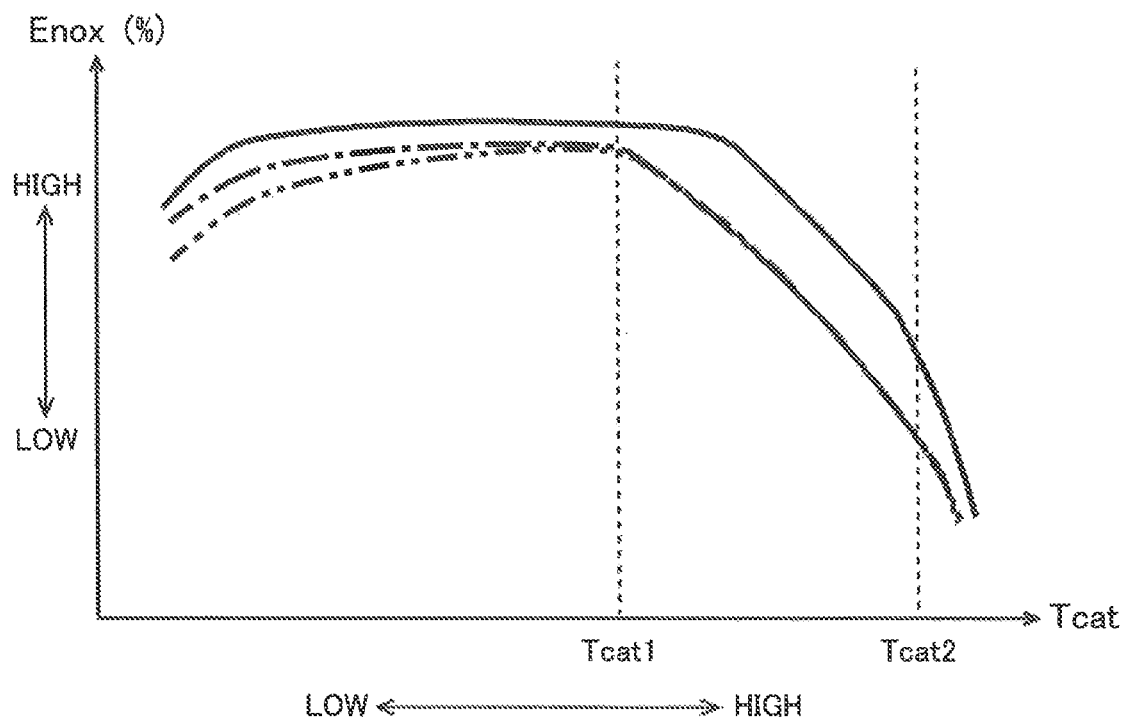
FIG. 5 is a view showing a relationship between a temperature Tcat of the selective reduction type catalyst and the $NO_x$ purification ratio EnoX of the selective reduction type catalyst.

FIG. 5 is a view showing a relationship between a temperature Tcat of the selective reduction type catalyst and the $NO_x$ purification ratio EnoX. A solid line in FIG. 5 shows the $NO_x$ purification ratio obtained before the selective reduction type catalyst deteriorates. Further, a dot-dash line in FIG. 5 shows the $NO_x$ purification ratio obtained when the selective reduction type catalyst has deteriorated and the NH3 adsorption amount is large, and a dot-dot-dash line in FIG. 5 shows the $NO_x$ purification ratio obtained when the selective reduction type catalyst has deteriorated and the NH3 adsorption amount is small.

In FIG. 5, when the temperature Tcat of the selective reduction type catalyst is lower than a predetermined temperature Tcat1, a difference between the $NO_x$ purification ratio obtained prior to deterioration of the selective reduction type catalyst and the $NO_x$ purification ratio obtained following deterioration of the selective reduction type catalyst decreases. This tendency becomes steadily more striking as the amount of NH3 adsorbed to the selective reduction type catalyst increases. Furthermore, when the amount of NH3 adsorbed to the selective reduction type catalyst is large, the $NO_x$ purification ratio EnoX may increase regardless of the addition frequency of the reducing agent and the deterioration condition of the selective reduction type catalyst. Accordingly, the absolute value of the modification difference □EnoX obtained when the amount of NH3 adsorbed to the selective reduction type catalyst is large may decrease regardless of the addition frequency of the reducing agent and the deterioration condition of the selective reduction type catalyst.

When the temperature Tcat of the selective reduction type catalyst equals or exceeds the predetermined temperature Tcat1, on the other hand, the difference between the $NO_x$ purification ratio obtained prior to deterioration of the selective reduction type catalyst and the $NO_x$ purification ratio obtained following deterioration of the selective reduction type catalyst increases. Further, when the temperature Tcat of the selective reduction type catalyst equals or exceeds the predetermined temperature Tcat1, the dot-dash line and the dot-dot-dash line in FIG. 5 show substantially equal $NO_x$ purification ratios. The reason for this is believed to be that when the temperature of the selective reduction type catalyst equals or exceeds the predetermined temperature Tcat1, the amount of $NO_x$ that can be adsorbed to the selective reduction type catalyst (referred to hereafter as an NH3 adsorption capacity) decreases, and therefore an effect of the NH3 adsorption amount on the $NO_x$ purification ratio EnoX decreases.

Hence, the processing for determining deterioration of the selective reduction type catalyst is preferably executed on condition that the temperature of the selective reduction type catalyst equals or exceeds a minimum temperature at which the NH3 adsorption capacity decreases, and more preferably equals or exceeds a minimum temperature (a lower limit value) at which the NH3 adsorption capacity reaches zero. At this time, the lower limit value varies according to a base material of the selective reduction type catalyst and materials of the catalyst carriers and catalysts. Therefore, the lower limit value is preferably determined in accordance with these materials.

The temperature of the selective reduction type catalyst may equal or exceed the lower limit value when regeneration processing is executed on the particulate filter housed in the first catalyst casing 3, immediately after the regeneration processing, and so on. Hence, the processing for determining deterioration of the selective reduction type catalyst may be executed during or immediately after processing for regenerating the particulate filter.

Further, by supplying unburned fuel to the oxidation catalyst in the first catalyst casing 3, the temperature of the exhaust gas flowing out of the first catalyst casing 3 (the temperature of the exhaust gas flowing into the second catalyst casing 4) can be increased to or above the lower limit value. Therefore, by causing the fuel injection valve in the cylinder to inject fuel (in the form of a post-injection or an after-injection) during an expansion stroke or an exhaust stroke, an ambient temperature inside the second catalyst casing 4 can be increased to or above the lower limit value.

Figure 6:
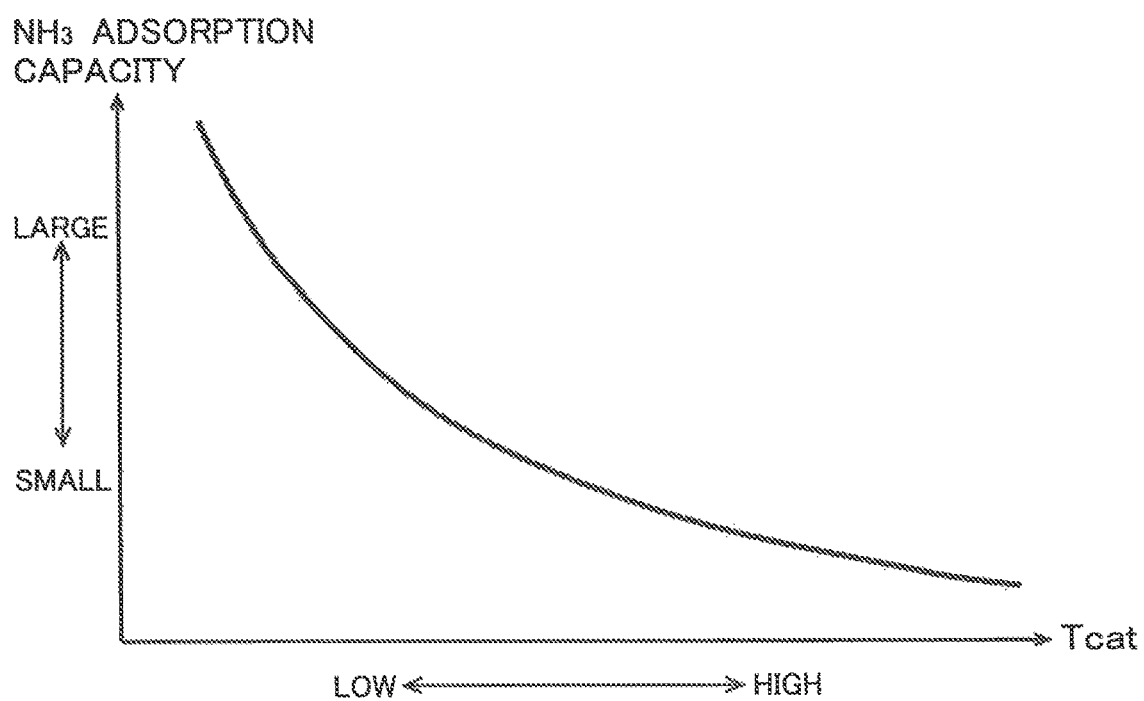
FIG. 6 is a view showing a relationship between the temperature Tcat of the selective reduction type catalyst and an NH3 adsorption amount of the selective reduction type catalyst.

Incidentally, as shown in FIG. 6, the NH3 adsorption capacity of the selective reduction type catalyst tends to decrease steadily as the temperature of the selective reduction type catalyst increases. When the temperature of the selective reduction type catalyst increases excessively, however, the $NO_x$ purification ratio of the selective reduction type catalyst tends to decrease regardless of the deterioration condition of the selective reduction type catalyst and the addition frequency of the reducing agent. In FIG. 5, for example, when the temperature of the selective reduction type catalyst exceeds a predetermined temperature Tcat2, the difference between the $NO_x$ purification ratio obtained prior to deterioration of the selective reduction type catalyst and the $NO_x$ purification ratio obtained following deterioration of the selective reduction type catalyst decreases. Therefore, when the deterioration determination processing is executed while the temperature of the selective reduction type catalyst is excessively high, the selective reduction type catalyst may be determined erroneously to have deteriorated despite not having deteriorated.

Hence, the processing for determining deterioration of the selective reduction type catalyst is preferably executed when the temperature of the selective reduction type catalyst is within a temperature range no lower than the lower limit value and no higher than an upper limit value. Here, the "upper limit value" corresponds to Tcat2 in FIG. 5, and indicates a temperature obtained by subtracting a margin from a temperature at which the difference between the absolute value of the modification difference □EnoX before the selective reduction type catalyst deteriorates and the threshold has a minimum magnitude for securing determination precision. In other words, the "upper limit value" is a temperature obtained by subtracting a margin from a minimum temperature at which a difference between the absolute value of the modification difference □EnoX before the selective reduction type catalyst deteriorates and the absolute value of the modification difference □EnoX following deterioration of the selective reduction type catalyst becomes striking. At this time, the upper limit value varies according to the base material of the selective reduction type catalyst and the materials of the catalyst carriers and catalysts, similarly to the lower limit value. Therefore, the upper limit value is determined in accordance with the base material of the selective reduction type catalyst and the materials of the catalyst carriers and catalysts.

As described above, when the processing for determining deterioration of the selective reduction type catalyst is executed while the temperature Tcat of the selective reduction type catalyst is within the predetermined temperature range, a reduction in determination precision due to the NH3 adsorption amount can be suppressed. In other words, when the processing for determining deterioration of the selective reduction type catalyst is executed while the temperature Tcat of the selective reduction type catalyst is within the predetermined temperature range, the determination as to whether or not the selective reduction type catalyst has deteriorated can be made more accurately.

Procedures executed during the deterioration determination processing according to this embodiment will now be described using FIG. 7. FIG. 7 is a flowchart showing a processing routine executed by the ECU 9 to determine whether or not the selective reduction type catalyst has deteriorated. This processing routine is stored in the ROM or the like of the ECU 9 in advance, and executed periodically by the ECU 9. Note that in the processing routine of FIG. 7, similar processes to the processing routine of the first embodiment (see FIG. 4) have been allocated identical step numbers.

Figure 7:
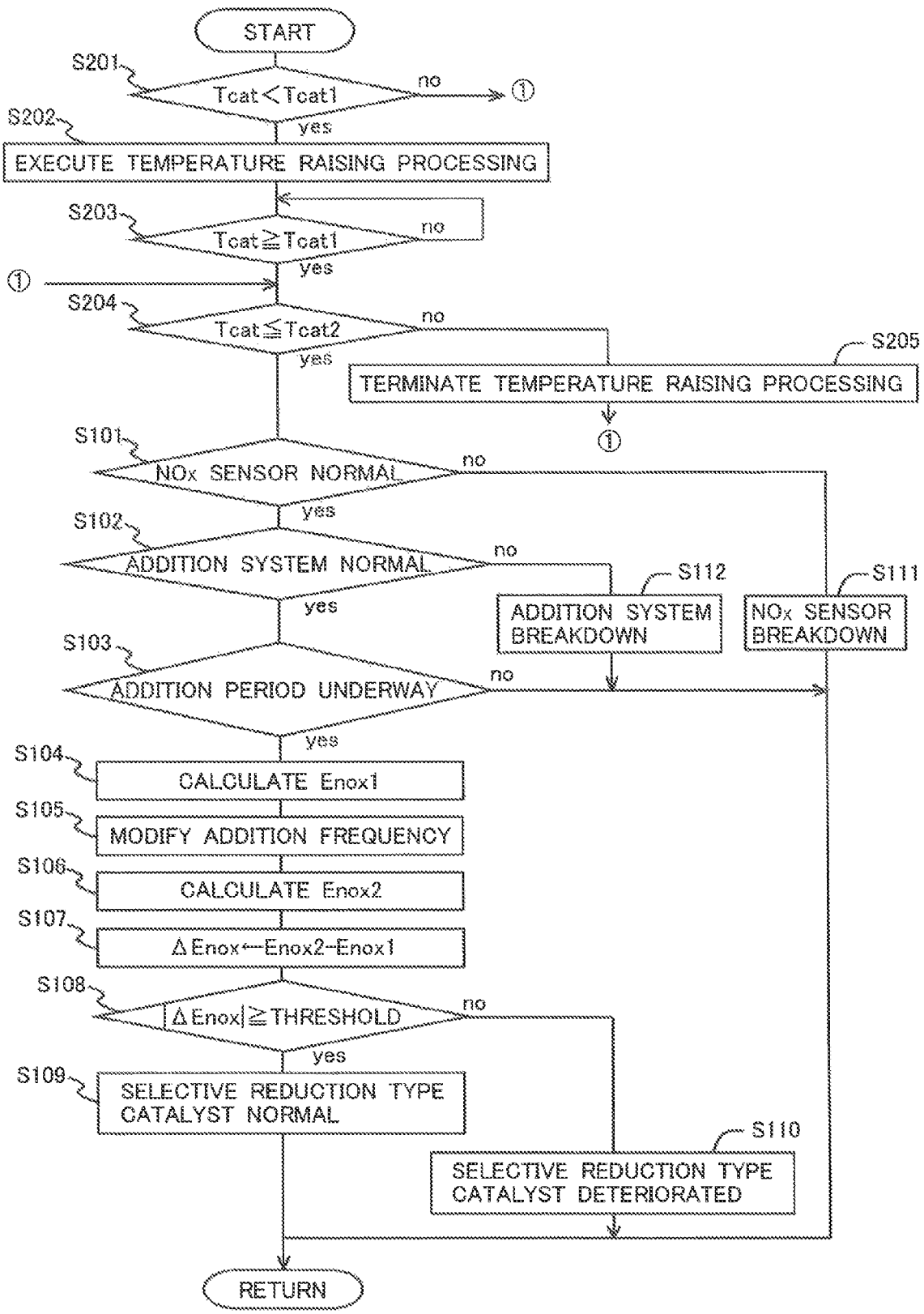
FIG. 7 is a flowchart showing a processing routine executed by the ECU when the processing for determining deterioration of the selective reduction type catalyst is executed according to a second embodiment.

In the processing routine of FIG. 7, first, in S201, the ECU 9 determines whether or not the temperature Tcat of the selective reduction type catalyst is lower than the lower limit value Tcat1. It is assumed at this time that the output signal of the exhaust gas temperature sensor 8 is used as the temperature Tcat of the selective reduction type catalyst.

When the determination of S201 is negative (Tcat □ Tcat1), the ECU 9 skips processing of S202 and S203, described below, and advances to processing of S204. When the determination of S201 is affirmative (Tcat<Tcat1), on the other hand, the ECU 9 advances to the processing of S202.

In S202, the ECU 9 executes temperature raising processing. More specifically, the ECU 9 supplies unburned fuel to the oxidation catalyst in the first catalyst casing 3 by causing the fuel injection valve in the cylinder to inject fuel (in the form of a post-injection or an after-injection) during the expansion stroke or the exhaust stroke. In this case, the unburned fuel is oxidized by the oxidation catalyst. Reaction heat generated upon oxidation of the unburned fuel is transmitted to the exhaust gas flowing through the first catalyst casing 3. As a result, the temperature of the exhaust gas flowing out of the first catalyst casing 3, or in other words the temperature of the exhaust gas flowing into the second catalyst casing 4, increases. The temperature of the selective reduction type catalyst is raised upon reception of the heat of the exhaust gas.

In S203, the ECU 9 determines whether or not the temperature Tcat of the selective reduction type catalyst has increased to or above the lower limit value Tcat1. When the determination of S203 is negative (Tcat<Tcat1), the ECU 9 repeats the processing of S203. When the determination of S203 is affirmative (Tcat □ Tcat1), on the other hand, the ECU 9 advances to the processing of S204.

In S204, the ECU 9 determines whether or not the temperature Tcat of the selective reduction type catalyst is equal to or lower than the upper limit value Tcat2. When the determination of S204 is negative (Tcat>Tcat2), the ECU 9 advances to processing of S205, where the temperature raising processing is terminated. More specifically, the ECU 9 stops the post-injection or the after-injection performed by the fuel injection valve. When the determination of S204 is affirmative (Tcat □ Tcat2), on the other hand, the ECU 9 advances to the processing of S101. The processing of S101 onward is identical to that of the processing routine according to the first embodiment, described above.

When the ECU 9 executes the processing for determining deterioration of the selective reduction type catalyst in accordance with the processing routine of FIG. 7 in this manner, similar effects to the first embodiment can be obtained, and moreover, the determination precision of the deterioration determination processing can be improved.

Third Embodiment

Next, a third embodiment of the deterioration detection system for an exhaust gas purification apparatus according to the present invention will be described on the basis of FIGS. 8 and 9. Here, configurations that differ from the first embodiment will be described, and description of similar configurations has been omitted.

This embodiment differs from the first embodiment in that when the selective reduction type catalyst is in a new or nearly new condition, the threshold used in the deterioration determination processing is reduced.

Figure 8:
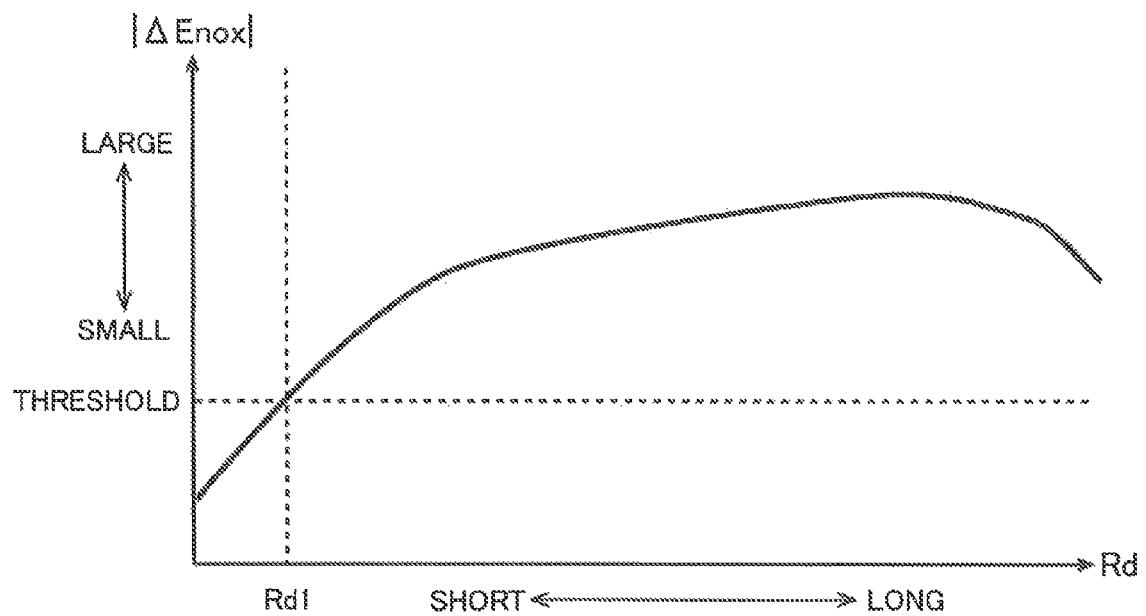
FIG. 8 is a view showing a relationship between a traveled distance Rd of a vehicle and an absolute value of a modification difference □EnoX.

FIG. 8 is a view showing a relationship between a traveled distance Rd of a vehicle in which the exhaust gas purification apparatus is installed and the absolute value (□□EnoX□) of the modification difference □EnoX before the selective reduction type catalyst deteriorates. Note that here, the "traveled distance" is a cumulative value of the distance traveled by the vehicle from a point at which the selective reduction type catalyst is installed in the vehicle in a new condition.

As shown in FIG. 8, when the traveled distance Rd of the vehicle equals or exceeds a fixed distance Rd1, the absolute value of the modification difference □EnoX rises above the threshold. When the traveled distance Rd of the vehicle is shorter than the fixed distance Rd1, on the other hand, the absolute value of the modification difference □EnoX falls below the threshold. The reason for this is believed to be that when the selective reduction type catalyst is in a new (or nearly new) condition, the oxidative capacity of the selective reduction type catalyst is high, and therefore the N2 reduced from the $NO_x$ is reoxidized into $NO_x$ such as NO and NO2.

Hence, in this embodiment, when the processing for determining deterioration of the selective reduction type catalyst is executed while the traveled distance Rd of the vehicle is shorter than the fixed distance Rd1, the threshold is set at a smaller value than when the processing for determining deterioration of the selective reduction type catalyst is executed while the traveled distance Rd of the vehicle equals or exceeds the fixed distance Rd1. Here, the "fixed distance" is a traveled distance determined in advance by adaptation processing using experiments and the like.

By determining the threshold using this method, a reduction in determination precision occurring when the processing for determining deterioration of the selective reduction type catalyst is executed with the selective reduction type catalyst in a new or nearly new condition, for example a situation in which the selective reduction type catalyst is determined erroneously to have deteriorated despite not having deteriorated, can be avoided.

Procedures executed during the deterioration determination processing according to this embodiment will now be described using FIG. 9. FIG. 9 is a flowchart showing a processing routine executed by the ECU 9 to determine whether or not the selective reduction type catalyst has deteriorated. This processing routine is stored in the ROM or the like of the ECU 9 in advance, and executed periodically by the ECU 9. Note that in the processing routine of FIG. 9, similar processes to the processing routine of the first embodiment (see FIG. 4) have been allocated identical step numbers.

Figure 9:
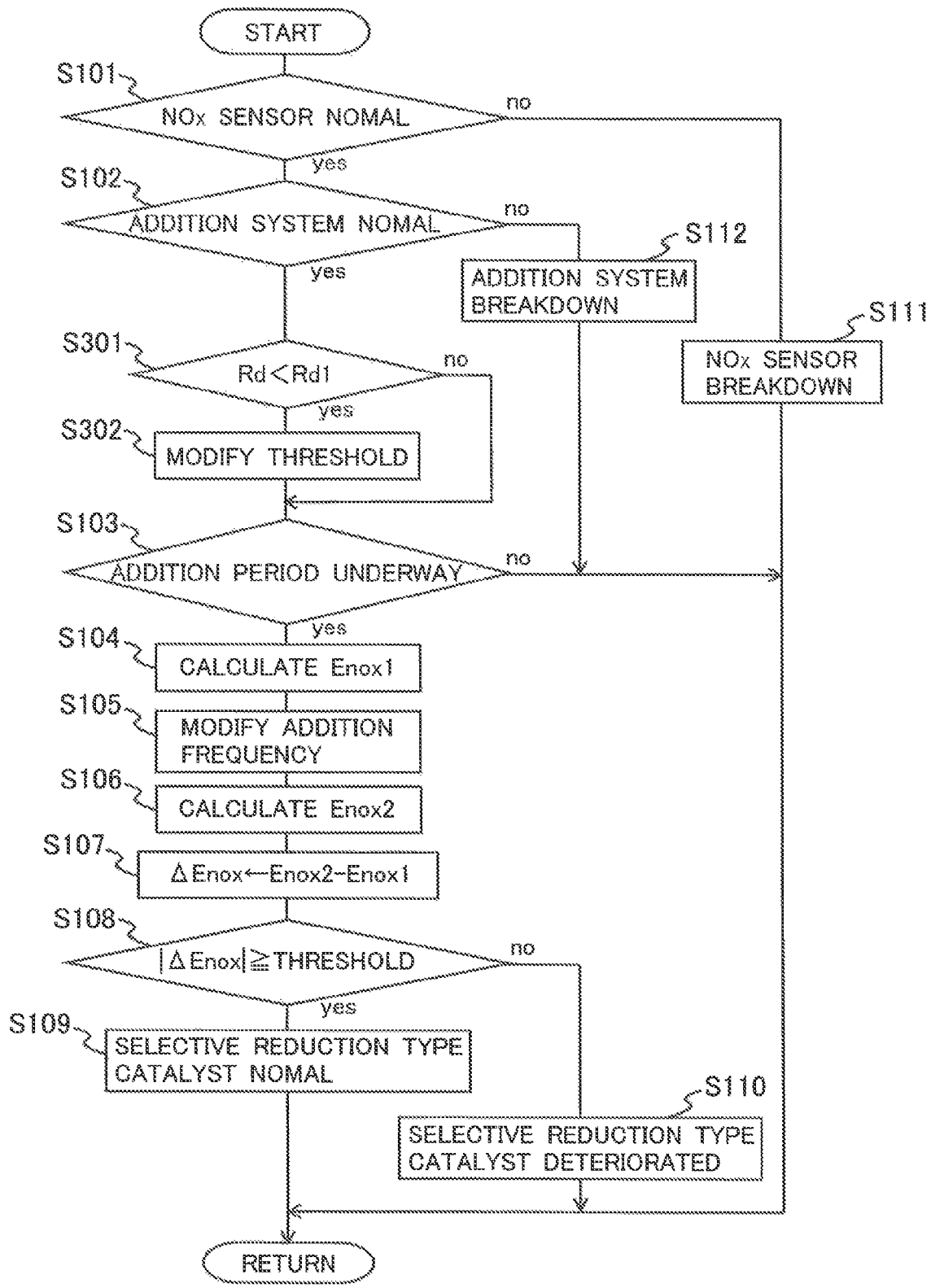
FIG. 9 is a flowchart showing a processing routine executed by the ECU when the processing for determining deterioration of the selective reduction type catalyst is executed according to a third embodiment.

When, in the processing routine of FIG. 9, the determination made during the processing of S102 is affirmative, the ECU 9 executes processing of S301. In S301, the ECU 9 determines whether or not the traveled distance Rd of the vehicle is shorter than the fixed distance Rd1. When the determination of S301 is negative (Rd □ Rd1), the ECU 9 skips processing of S302, described below, and advances to the processing of S103. When the determination of S301 is affirmative (Rd<Rd1), on the other hand, the ECU 9 advances to the processing of S302.

In S302, the ECU 9 modifies the magnitude of the threshold. More specifically, the ECU 9 modifies the threshold to a smaller value than when the traveled distance Rd equals or exceeds the fixed distance Rd1. The threshold at this time takes a smaller value than a value that can be taken by the absolute value of the modification difference when the selective reduction type catalyst is in a non-deteriorated, new condition. This value is determined in advance by adaptation processing using experiments and the like.

After executing the processing of S302, the ECU 9 advances to the processing of S103. The processing from S103 onward is identical to that of the processing routine according to the first embodiment, described above.

When the ECU 9 executes the processing for determining deterioration of the selective reduction type catalyst in accordance with the processing routine of FIG. 9, similar effects to the first embodiment can be obtained. Furthermore, a reduction in determination precision occurring when the selective reduction type catalyst is in a new or nearly new condition can be suppressed.

Note that in this embodiment, an example in which the traveled distance Rd of the vehicle is used as a parameter for identifying the period in which the oxidative capacity of the selective reduction type catalyst increases was described. However, a cumulative value of an operating time of the internal combustion engine 1 from the point at which the new selective reduction type catalyst is installed in the vehicle, an integrated value of the exhaust gas temperature, or an integrated value of the fuel injection amount may be used instead. In short, any parameter that correlates with a reduction in the oxidative capacity of the selective reduction type catalyst may be used.

Further, this embodiment may be combined with the second embodiment. In so doing, the determination precision of the deterioration determination processing can be improved even further.

Other Embodiments

Figure 10:
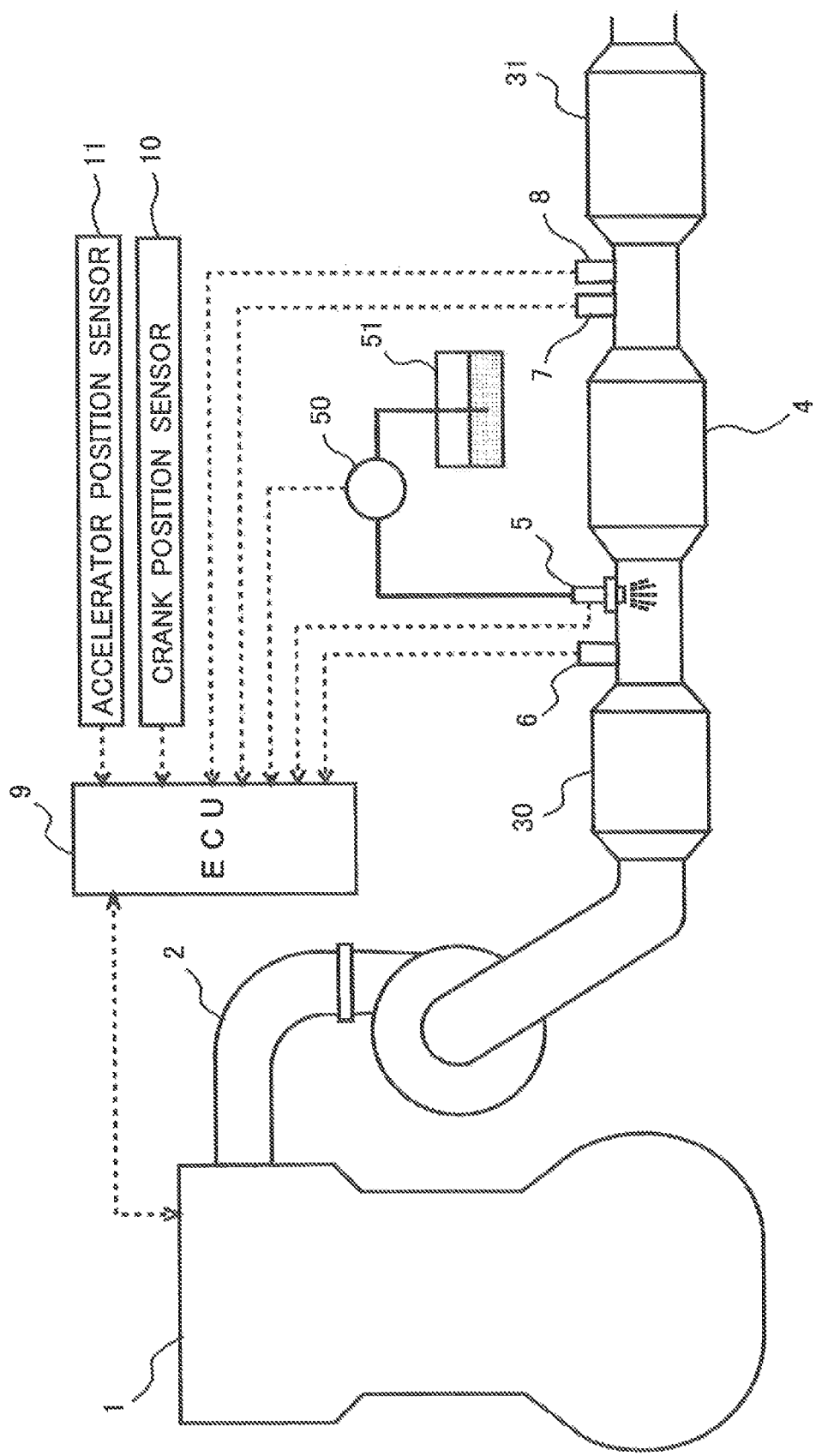
FIG. 10 is a view showing another example of the configuration of the exhaust system to which the present invention is applied.
Figure 11:
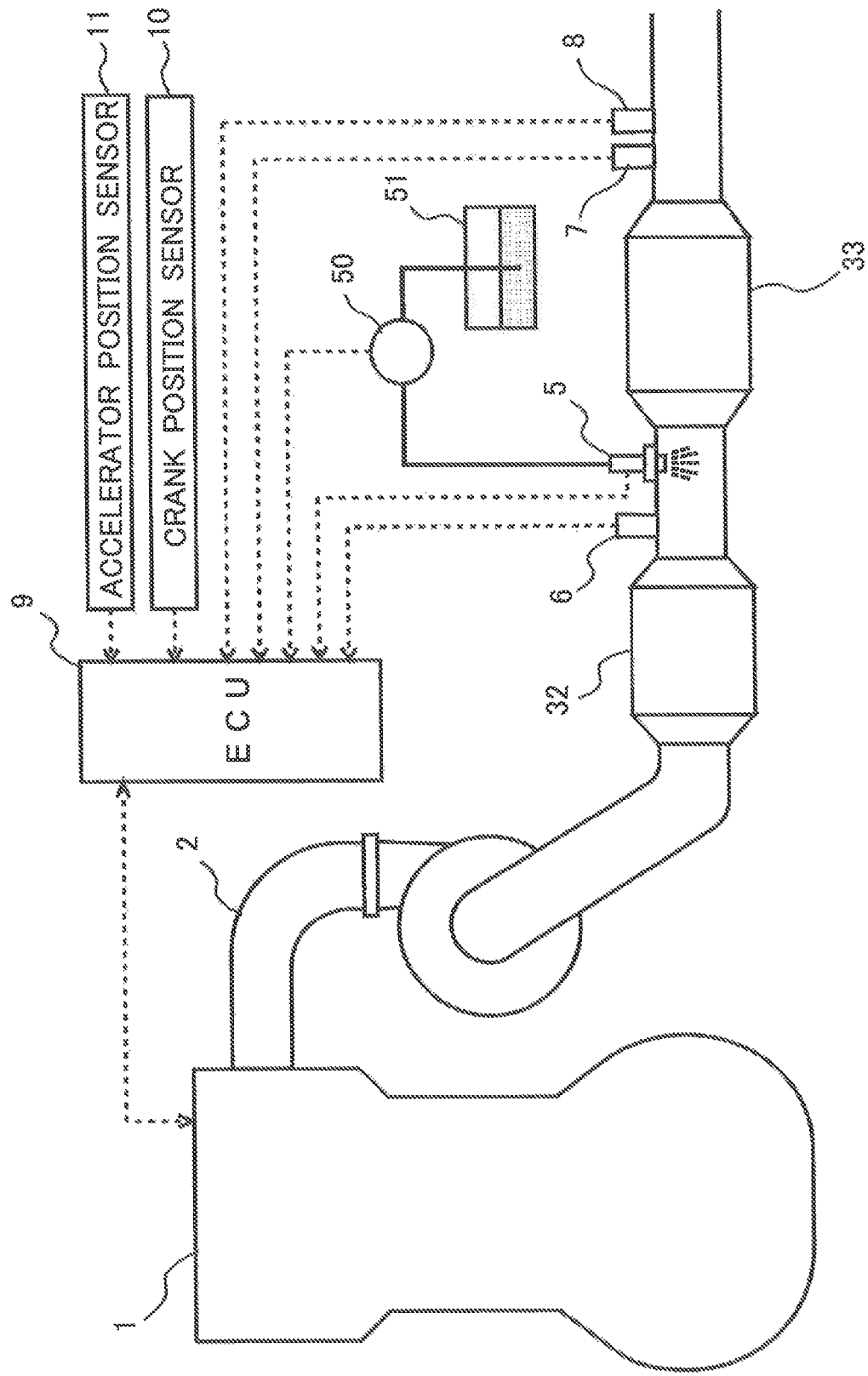
FIG. 11 is a view showing a further example of the configuration of the exhaust system to which the present invention is applied.

In the first to third embodiments, examples in which the processing for determining deterioration of the selective reduction type catalyst is executed in a configuration where the second catalyst casing 4 housing the selective reduction type catalyst is disposed downstream of the first catalyst casing 3 housing the oxidation catalyst and the particulate filter were described. However, the configuration to which the present invention is applied is not limited to the configuration described above. As shown in FIG. 10, for example, the deterioration determination processing according to the present invention may also be executed in a configuration where a third catalyst casing 30 housing the oxidation catalyst is disposed in the exhaust passage 2 upstream of the second catalyst casing 4, in which the selective reduction type catalyst is housed, and a fourth catalyst casing 31 housing the particulate filter is disposed in the exhaust passage downstream of the second catalyst casing 4. Further, as shown in FIG. 11, the deterioration determination processing according to the present invention may be executed in a configuration where a sixth catalyst casing 33 housing the selective reduction type catalyst and the particulate filter is disposed downstream of a fifth catalyst casing 32 housing the oxidation catalyst. At this time, the selective reduction type catalyst may be carried on a catalyst carrier provided separately to the particulate filter, or on the particulate filter.

EXPLANATION OF REFERENCE NUMERALS AND CHARACTERS 1 internal combustion engine
2 exhaust passage
3 first catalyst casing
4 second catalyst casing
5 reducing agent adding valve
6 upstream side $NO_x$ sensor
7 downstream side $NO_x$ sensor
8 exhaust gas temperature sensor
9 ECU
30 third catalyst casing
31 fourth catalyst casing
32 fifth catalyst casing
33 sixth catalyst casing
50 pump
51 reducing agent tank

The invention claimed is:

1. A deterioration detection system for an exhaust gas purification apparatus, comprising:
a selective reduction catalyst disposed in an exhaust passage of an internal combustion engine;
a reducing agent adding valve disposed in the exhaust passage upstream of the selective reduction catalyst in order to add a reducing agent constituted by an ammonia precursor to exhaust gas;
a NOx sensor disposed in the exhaust passage downstream of the selective reduction catalyst in order to measure an amount of nitrogen oxide contained in the exhaust gas;
an electronic control unit programmed to:
calculate a NOx purification ratio, which is a ratio of an amount of nitrogen oxide purified by the selective reduction catalyst relative to an amount of nitrogen oxide flowing into the selective reduction catalyst, using a measurement value of the NOx sensor as a parameter;
execute modification processing, in which the reducing agent adding valve is controlled in order to modify an addition interval thereof while keeping an addition amount per fixed time period constant, during a reducing agent addition period of the reducing agent adding valve;
execute determination processing, in which a determination is made as to whether or not the selective reduction catalyst has deteriorated, on the basis of a difference in the NOx purification ratio calculated before and after the addition interval is modified; and
generate, based on the determination, a notification indicating that the catalyst has deteriorated.

2. The deterioration detection system for an exhaust gas purification apparatus according to claim 1, wherein the electronic control unit is further programmed to determine that the selective reduction catalyst has deteriorated when the difference in the NOx purification ratio calculated before and after the addition interval is modified is smaller than a threshold.

3. The deterioration detection system for an exhaust gas purification apparatus according to claim 2, wherein the threshold is set at a smaller value when a traveled distance of a vehicle is shorter than a fixed distance than when the traveled distance equals or exceeds the fixed distance.

4. The deterioration detection system for an exhaust gas purification apparatus according to claim 3, wherein the electronic control unit is further programmed to determine a degree of deterioration in the selective reduction catalyst to be steadily higher as the difference in the NOx purification ratio calculated before and after the addition interval is modified decreases below the threshold.

5. The deterioration detection system for an exhaust gas purification apparatus according to claim 4, wherein the electronic control unit is further programmed to execute the modification processing and the determination processing on condition that a temperature of the selective reduction catalyst equals or exceeds a lower limit value.

6. The deterioration detection system for an exhaust gas purification apparatus according to claim 5, wherein the electronic control unit is further programmed to not execute the modification processing and the determination processing when the temperature of the selective reduction catalyst exceeds an upper limit value.

7. The deterioration detection system for an exhaust gas purification apparatus according to claim 3, wherein the electronic control unit is further programmed to execute the modification processing and the determination processing on condition that a temperature of the selective reduction catalyst equals or exceeds a lower limit value.

8. The deterioration detection system for an exhaust gas purification apparatus according to claim 7, wherein the electronic control unit is further programmed to not execute the modification processing and the determination processing when the temperature of the selective reduction catalyst exceeds an upper limit value.

9. The deterioration detection system for an exhaust gas purification apparatus according to claim 2, wherein the electronic control unit is further programmed to determine a degree of deterioration in the selective reduction catalyst to be steadily higher as the difference in the NOx purification ratio calculated before and after the addition interval is modified decreases below the threshold.

10. The deterioration detection system for an exhaust gas purification apparatus according to claim 9, wherein the electronic control unit is further programmed to execute the modification processing and the determination processing on condition that a temperature of the selective reduction catalyst equals or exceeds a lower limit value.

11. The deterioration detection system for an exhaust gas purification apparatus according to claim 10, wherein the electronic control unit is further programmed to not execute the modification processing and the determination processing when the temperature of the selective reduction catalyst exceeds an upper limit value.

12. The deterioration detection system for an exhaust gas purification apparatus according to claim 2, wherein the electronic control unit is further programmed to execute the modification processing and the determination processing on condition that a temperature of the selective reduction catalyst equals or exceeds a lower limit value.

13. The deterioration detection system for an exhaust gas purification apparatus according to claim 12, wherein the electronic control unit is further programmed to not execute the modification processing and the determination processing when the temperature of the selective reduction catalyst exceeds an upper limit value.

14. The deterioration detection system for an exhaust gas purification apparatus according to claim 1, wherein the electronic control unit is further programmed to execute the modification processing and the determination processing on condition that a temperature of the selective reduction catalyst equals or exceeds a lower limit value.

15. The deterioration detection system for an exhaust gas purification apparatus according to claim 14, wherein the electronic control unit is further programmed to not execute the modification processing and the determination processing when the temperature of the selective reduction catalyst exceeds an upper limit value.

16. The deterioration detection system for an exhaust gas purification apparatus according to claim 1, wherein the electronic control unit is further programmed to diagnose a breakdown in the reducing agent adding valve, and execute the modification processing and the determination processing on condition that a breakdown in the reducing agent adding valve has not been diagnosed.

17. The deterioration detection system for an exhaust gas purification apparatus according to claim 16, wherein the electronic control unit is further programmed to determine that a breakdown has not occurred in the reducing agent adding valve when an amount of variation in the NOx purification ratio following shortening of the addition interval is equal to or smaller than a reference value.

* * * * *